April 14, 1970   E. STAUBER   3,506,105
ASSEMBLY LINE APPARATUS
Filed Feb. 27, 1968
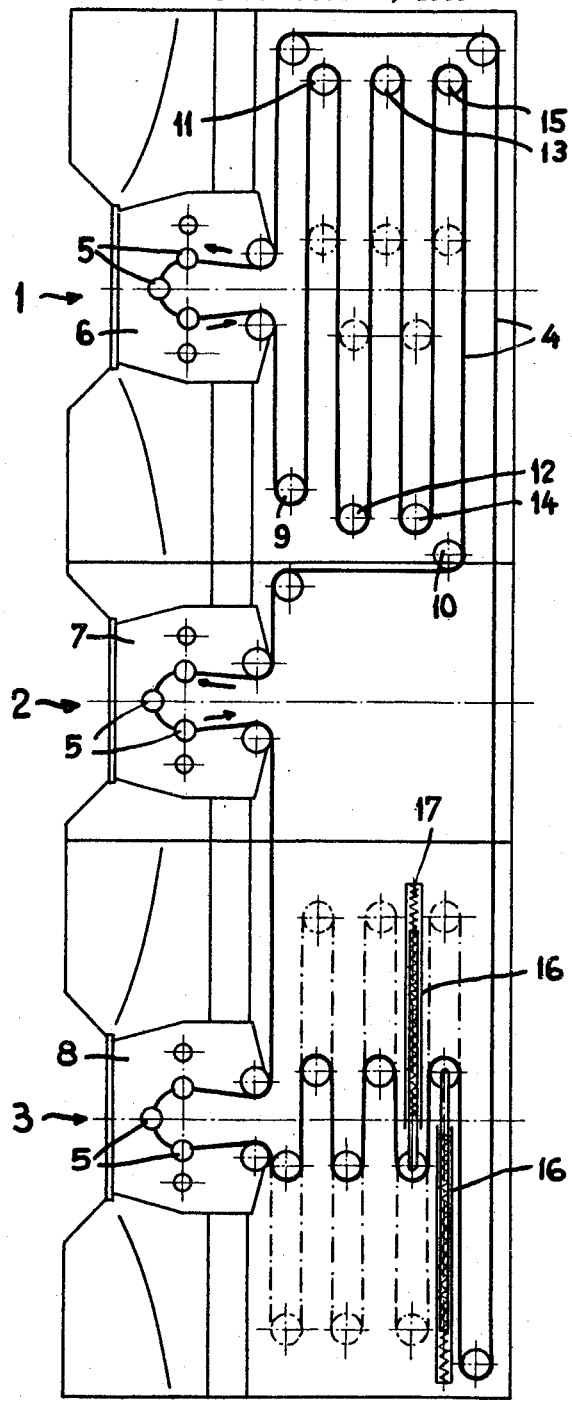
INVENTOR.
ERNST STAUBER
BY Jacobi & Davidson
ATTORNEYS.

# United States Patent Office 3,506,105
Patented Apr. 14, 1970

3,506,105
ASSEMBLY LINE APPARATUS
Ernst Stauber, Lengnau, near Biel, Switzerland, assignor to Langendorf Watch Co., Langendorf, Switzerland, a body corporate of Switzerland
Filed Feb. 27, 1968, Ser. No. 708,683
Claims priority, application Switzerland, Mar. 7, 1967,
3,300/67
Int. Cl. B23q 7/00; B65g 17/32
U.S. Cl. 198—19
2 Claims

ABSTRACT OF THE DISCLOSURE

An assembly line apparatus for performing successive operations on a series of like work pieces of small size, for example on watch mechanisms, combining the possibility of manual and completely automatic processing at various working stations. To compensate for temporary working stops at manually operated stations the conveyor conveying loaded work piece holders in steps through the working stations has an excess length guided so as to form a buffer zone before and after such manually operated working stations.

BACKGROUND OF THE INVENTION

The invention relates to assembly line apparatus and in particular to assembly line apparatus for performing a plurality of successive operations on a series of like work pieces of small size.

Assembly line apparatus for carrying out successive operations on a series of similar small work pieces, for example, micro-switches or clockwork mechanisms, have become known to the art, comprising a casing which can be arranged on a fitter's worktable, an operating or work station, and conveying means for conveying and guiding a row of loaded workpiece holders successively in steps out of the casing through the working station and back into the casing again. The workpiece holders thus travel on a closed circuit. At the working station, the workpiece holders and, if required, the work pieces thereon, can be fixedly located at the end of each conveyor step, so that a particular operation, for example, inserting a part, screwing a screw into a tapped hole previously bored, preparing such a tapped hole, or oiling bearings, can be carried out at exactly the same spot, either manually or mechanically, successively on each workpiece brought to the operation station.

If this operation is carried out at one operating position for all work pieces accommodated in such an apparatus, then either a subsequent operation can take place or, as is normal with group working, the assembly device is advanced to an adjacent operating position where a further operation is carried out on all its workpieces, and so on.

In accordance with the operating principles of progressive assembly line units, only a specific number of processes, usually one, is carried out at each operating position on each of the work pieces successively brought to this fixed operating position at a working station of the apparatus.

Assembly line apparatus of the kind mentioned above are described for example in U.S. Patents Nos. 3,235,-056 and 3,236,359 and in Swiss Patent No. 446,187.

Technically speaking, such an assembly device works as an individual assembly line and as such cannot be unconditionally inserted in a progressive assembly line apparatus. If it is so inserted, however, there arises a flow of material according to the operating principles of independent conveyor belts, that is, after the treatment at a certain operating position of all the work pieces which an assembly device contains the work pieces, through an intermediate store which may be required, and in the present case together with the assembly device, are carried to a further working position in accordance with requirements. If the operations on the work pieces are performed manually at all the operating stations, then this arrangement of continuous belts in one progressive assembly line is not disadvantageous.

If, however, a few of the successive operating positions are worked manually and others completely automatically, the most important advantage of this arangement, that is, the ability to accommodate the individual working speeds of each operator, is no longer obtained.

Linking the means for conveying the work pieces successively to all the operating positions in a fixed manner is very prone to trouble with progressive assembly line apparatus combining manual and completely automatic processing at various working stations, less for reasons relating to conveyor techniques than for reasons of organization.

It is obvious that a fault at one operating station of such apparatus stops the operations at every following station. At present interruptions at the manually operated stations are unavoidable, because no operator is able to work continuously at exactly the same speed, throughout the entire working period, as happens at the fully automatic operating stations.

The object of the present invention is to provide an assembly line apparatus avoiding this disadvantage and in which temporary working stops at single operating positions, particularly manually operated positions, are possible without disturbing the progress of the operations at the other working positions.

SUMMARY OF THE INVENTION

The invention accordingly provides an assembly line apparatus for the performance of successive operations on a series of like small work pieces, the apparatus having a conveyor element for conveying a plurality of loaded work piece holders successively in steps through a plurality of operating positions in a closed circuit, the conveyor element having excess length guided so as to form a buffer zone before and after at least one of the operating positions.

BRIEF DESCRIPTION OF THE DRAWING

The invention will be better understood, and objects other than those set forth above, will become apparent, when considerations is given to the following detailed description thereof. Such description makes reference to the annexed drawing, the single figure of which is a schematic plan view of an apparatus having three operating positions.

DESCRIPTION OF THE PREFERRED EMBODIMENT

The apparatus illustrated has three operating positions 1, 2 and 3 and it is assumed that at the operating position 1, an operator carries out a manual operation on each of many work pieces as these are conveyed successively past him, whilst at the operating positions 2 and 3 the work pieces are treated automatically. The work pieces are transported by a conveyor element in the form of an endless chain 4 with work piece holders 5 attached thereto at closely spaced positions; only a few of the holders are shown, these being the holders at the operating positions. The chain 4 with the work piece holders 5 runs in a casing for most of its length so as to be protected from dirt and only comes out of this casing over loop-shaped working portions of its path at the actual operating positions 1, 2 and 3. The work piece holders 5 are preferably firmly fixed to the links of the chain 4 by short connecting pieces and are carried out from the casing to platforms 6, 7, 8 which serve as work stations and which constitute supports for steadying the holders. The chain 4 is thus passed through each work station under the platform and the connecting links extend up through a slit in the platform, the slit of course following the loop-shaped course of the chain beneath the platform.

The chain is advanced in steps by any convenient means, for example as described in the patent specification already mentioned, which means therefore will not be further explained or illustrated. A very precise positioning of the work piece holders at the operating stations at the end of each advance step is thereby obtained. The work pieces to be treated are fixed on the holders 5 so that an automatic treatment process, for example, screwing a screw into a previously bored hole, inserting a part, or oiling bearings, can be carried out by fixedly located tools at the fully automatic work stations of the operating positions 2 and 3 in synchronism with the reception and stabilization of the work pieces.

The way in which the work piece holders are brought successively in steps into the operating position by a motor provided at some or all of the work stations can likewise be understood from the patent specifications previously mentioned and thus requires no special explanation.

In contrast to known assembly apparatus, the chain 4 of the apparatus illustrated does not lead the work piece holders by the shortest route from the operating station 1 for manual treatment, to the operating station 2 for fully automatic treatment, but the closed path of the conveyor chain instead has an excess length which is accommodated in a zig-zag pattern, in loops between the station 1 and the station 2. To this end, the chain 4 is guided between guide pulleys 9 and 10 via further guide pulleys 11, 12, 13, 14, 15. Each of the pulleys 11–15 is mounted at the end of an extensible telescopic arm 16, shown in detail at the lower part of the figure, by way of example, in respect of two of the pulleys. The loops are kept continuously taut by a pressure spring 17 in each telescopic arm. This resilient guidance of the conveyor chain forms a buffer zone. If the work pieces treated at the working position 1 are not needed immediately at the working position 2, that is, if the operator at the position 1 works faster than the automatic arrangement at the position 2, the store formed by the loops of the conveyor chain is filled up. The work pieces necessary for this back log are drawn from a store arranged upstream of the position 1 which is shown in the drawing as formed by resiliently urged pulleys downstream of the operating position 3 in exactly the same way as the store adjoining the position 1.

If a certain back log of the operations at the working position 1, as compared to the fixed working steps at the operating positions 2 and 3, is once reached, the buffer zone between the working places 1 and 2 automatically accommodates, to a certain degree any breakdowns or delays in the work cycle at the operating position 1 without affecting the ordered successive flow of the work pieces between the operating positions. Although it is connected in a progressive assembly line with a fixed rhythm of working at fully automatic operating positions, the operating position 1 can be worked manually within certain limits according to individual working rhythms, and, what is of considerable importance with delicate manual operations, in particular, watch assembly, the time which is available for manually treating each work piece at the manual operating position does not have to be predetermined, as would be the case in a fixed-time assembly line unit, but can vary within certain limits. This allows the conveyor mechanism at the operating position 1 to be controlled separately by the operator, provided of course that his average operating time corresponds to the operating times at the following completely automatic work positions.

The flow of the work pieces delivered to and withdrawn from the operating position 1 to the operating position 2 through the buffer zone can be supervised without any technical difficulties, so that delivery to the operation position 2 for example is stopped when the store becomes empty due to a long delay at the operating position 1.

In the position illustrated in the drawing, the store provided upstream of the operating position 1 is empty and the store installed at the outlet side of this position is full. The extreme reverse position is shown by a chain dotted line.

What is claimed is:

1. An assembly line apparatus for the performance of successive working operations at a plurality of spaced operating stations at each of which work is performed on a series of like individual small work pieces supported on work piece holders, said apparatus including movable conveyor means arranged to move in steps in a conveying path through a closed circuit successively to and past all said operating stations, individual work piece holders secured to said conveyor means at fixed distances from one another, and between at least some of said operating stations, means for guiding said conveyor means and thus said work piece holders to move in elastically extensible and contractable loops so as to define a buffer zone in which a preceding operating station accumulates work piece containing work holders in accordance with the working rhythm at said preceding station and a succeeding operating station receives work piece containing work holders in accordance with the working rhythm at said succeeding operating station, whereby interruption in the working rhythm at said preceding station up to a time period corresponding to the sum of the working time periods at which work is performed at said succeeding operating station upon all said work pieces accumulated in said buffer zone does not adversely influence the efficiency of said succeeding operating station.

2. An assembly line apparatus as defined in claim 1, and said operating stations including operating stations for automatically performing working operations on successive work pieces at a fixed working rhythm and at least one operating station for manually performing working operations on successive work pieces at a variable working rhythm and the means for guiding said conveyor means to define a buffer zone being arranged in said conveying path in advance of and after each operating station for manually performing working operations.

References Cited

UNITED STATES PATENTS 2,933,176   4/1960   Mansson _____ 198—139
2,975,885   3/1961   Grundelman _____ 198—208 X GERALD M. FORLENZA, Primary Examiner GEORGE F. ABRAHAM, Assistant Examiner U.S. Cl. X.R.

198—208, 139